Patented Oct. 9, 1951

2,570,861

UNITED STATES PATENT OFFICE 2,570,861

LINEAR POLYMERS WHICH HAVE FORMAL-CONTAINING EXTRALINEAR SUBSTITUENTS AND WHICH ARE OBTAINED FROM MONOETHYLENICALLY UNSATURATED COMPOUNDS

Milton J. Roedel, Wilmington, Del., assignor to E. I. du Pont de Nemours & Company, Wilmington, Del., a corporation of Delaware No Drawing. Application April 26, 1948,
Serial No. 23,399

3 Claims. (Cl. 260—89.5)

This invention relates to new compositions of matter and particularly to polymeric materials.

This invention has as an object the production of new and useful polymeric compositions. A further object is a new type of polymeric material which is of especial value in the coating art, and which upon heat-treatment of the applied coating yields films of unusual inertness, hardness, and flexibility. Further objects reside in methods for obtaining these compositions. Other objects will appear hereinafter.

The new polymeric material described herein comprises a linear polymer having, as extralinear substituents, mono-valent radicles having the formal-containing group

wherein R is a hydrocarbon radical, and X is a bivalent organic radical, said monovalent radical being attached to a carbon atom which is an integral part of the polymer chain. This invention includes, as a particularly valuable embodiment thereof, the insolubilized product obtained by heat treatment of the above described polymeric material.

The linear polymers of this invention are prepared by subjecting to polymerizing conditions a polymer-forming composition containing a reactant having the formal-containing group mentioned above. Thus, the polymers can be prepared by polymerization of a polymerizable compound of the general formula

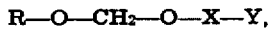

wherein R is a hydrocarbon radical, preferably of from 1 to 8 carbon atoms, X is a bivalent organic radical comprising such groups as hydrocarbon radicals, alkyleneoxy radicals, alkyleneoxycarbonyl radicals, alkylenecarbonyloxy radicals, and alkyleneoxycarbonyl (arylenecarbonyloxy) radicals, and Y is an ethylenically unsaturated group which may be either the group $H_2C=C—$, which includes the vinyl and vinylidene groups, or the vinylene group, $—CH=CH—$. Examples of monomeric formals of this kind are vinyl methoxymethoxyacetate, allyl methoxymethoxyacetate, vinyl methoxymethoxyethyl glycolate, methoxymethoxyethyl methacrylate, methoxymethoxyethyl acrylate, bis(methoxymethoxyethyl) fumarate, bis(methoxymethoxyethyl)-maleate, methoxymethoxystyrene (o, m, or p), benzoxymethoxyethyl methacrylate, benzyloxymethoxyethyl methacrylate, cyclohexyloxymethoxyethyl methacrylate, hexoxymethoxy propyl vinyl ether, vinyl methoxymethoxyethyl phthalate, and the like.

The above mentioned monomeric formals can be polymerized either alone or in admixture with from 5 to 95% by weight of another polymerizable organic compound, e. g., vinyl, vinylidene, or vinylene compounds, dienes, carbon monoxide, or halogen substituted ethylenes. The polymerization is conducted under conditions similar to those used in obtaining the known polymers from vinyl, vinylidene, or vinylene compounds which do not contain the formal group which is present in the compounds polymerized in the practice of this invention. In general the polymerization is conducted at temperatures of from 20° to 250° C. and pressures which, depending upon the materials being polymerized, range from atmospheric to 3000 atmospheres or more. The polymerization can be carried out in bulk, in emulsion or in solution using water alone as the medium or water in conjunction with an organic solvent, e. g., benzene, toluene, xylene, methanol, isopropanol, tertiary butyl alcohol, isooctane, cyclohexane, methyl acetate, butyl acetate, chloroform, carbon tetrachloride, acetone, methyl isobutyl ketone, etc. Mixtures of organic solvents can also be used, e. g., 50/50 mixtures by weight of xylene and methyl isobutyl ketone. After the desired degree of polymerization has occurred, the resulting polymer can be isolated by conventional methods, or the polymer used as formed in solution or in suspension. The polymerization may be effected either as a batch, semi- or continuous operation. For continuous operation the constant environment method is generally preferred for pressures below 300 atmospheres and the tubular reactor for pressures above 300 atmospheres.

These polymers are thermoset by heat-treatment and contact with an acidic material. The thermoset products are difficulty fusible, insoluble in solvents for the unconverted polymers, and they possess an unusual combination of valuable properties which are referred to in more detail later. The heat-treatment is conducted at temperatures above 65 C. in the presence of a catalytic amount of an organic or inorganic acid or acid-yielding material, examples of which are alphacamphorsulfonic acid, butanesulfonic acid, benzenesulfonic acid, etc., hydrochloric acid, etc.; zinc chloride, aluminum chloride, ferric chloride, stannic chloride, etc. Usually conversion of the polymer is obtained by employing from 0.001 to 5% of the acid or acid-yielding material, based on the weight of the polymeric polyformal in the composition. In practice the conversion of the polymeric polyformal is usually effected by dissolving the polymeric polyformal in a suitable solvent; adding the conversion catalyst; depositing the solution to form a film, fiber, etc.; and then subjecting to heat-treatment until the desired change has been effected. As a rule, conversion occurs at temperatures in the range of 65° to 180° C. in about 20 to 30 minutes. If desired, longer curing times can be employed at lower temperatures.

The invention is further illustrated by the following examples in which the parts are by weight unless otherwise specified.

*Example I*

Methoxymethoxyethyl methacrylate

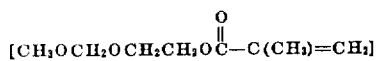

was synthesized by ester interchange between methoxymethoxyethanol (U. S. 2,321,608) and methyl methacrylate, using sodium methylate as catalyst and p-phenylenediamine as a polymerization inhibitor. Benzene was used as the medium and the mixture was heated at around 90° C. until the theoretical quantity of benzene-methanol azeotrope was fractionated off at 58° to 59° C. The methoxymethoxyethyl methacrylate was then fractionated off and stored at dry ice temperature under nitrogen. It boils at 68° to 70° C./2 mm. pressure and has an $n_D^{25}$ of 1.4305.

A stainless steel pressure reactor was flushed with oxygen-free nitrogen and charged with 176 parts of benzene and 4 parts of tertiary butyl alcohol to serve as a reaction medium, 0.25 part of maleic anhydride, 25 parts of methoxymethoxyethyl methacrylate, and 1 part of alpha, alpha'-azodiisobutyronitrile to serve as the polymerization catalyst. This charge occupied about 37 percent of the volume of the reactor. After removal of the nitrogen by evacuation, the reactor was cooled and 225 parts of vinyl chloride was added. The charge in the reactor was then agitated and heated to 60° C. The polymerization proceeded during a 10-hour period under autogenous pressure. At the end of the polymerization period the reactor was cooled to room temperature and the excess vinyl chloride bled off. Acetone was added to the reaction mixture and the solution coagulated with methanol. The yield was 50 parts of solid polymer which, by chlorine analysis was shown to contain 64 percent combined vinyl chloride and 36 percent combined methoxymethoxyethyl methacrylate. A 10 percent solution by weight of this polymer in cyclohexanone possessed a viscosity of 0.14 poise at 25° C.

Twenty-six parts of the above described polymer was sheeted on a roll mill heated to 50° C., 13 parts of titanium dioxide was added, and the stock thoroughly compounded. An enamel of 34% solids content was prepared by treating the mill stock with 75 parts of a 50/50 weight mixture of xylene and methyl isobutyl ketone. The viscosity of the enamel as determined in a Zahn No. 2 cup was 35 seconds (spray viscosity). This enamel was applied to bonderized autobody steel panels at 1 mil coating thickness. In one instance the coating was air dried at room temperature for 24 hours, and in another instance the coating was baked for 30 minutes at 149° C. The air-dried coating remained soluble in ketone solvents, it was brittle to impact, it was readily marred, it eroded within 24 hours in a soap bath and it was very thermoplastic at 66° C. The thermoset coating possessed to an optimum degree all of the properties most desired in enamel coatings. The testing data obtained on the thermoset coating are tabulated in the following table.

| Test | Properties |
|---|---|
| Color | White. |
| Gloss | Excellent. |
| Pencil Hardness | 7H. |
| Impact Flexibility | Excellent. |
| Mar Resistance | Do. |
| Print Resistance at 66° C | No print. |
| Solvent Resistance (50/50 xylene/methyl isobutyl ketone) | Unaffected. |
| Soap Bath Resistance (2% Gold Dust solution at 74° C.) | No effect after one week. |
| Adhesion | Excellent. |
| 20% H$_2$SO$_4$—16 hours | No effect. |
| Alkali Resistance (1% NaOH—2 hours) | Excellent. |
| Grease Resistance (50/50 Oleic acid/cottonseed oil—3 months) | Do. |

The outstanding combination of properties possessed by the methoxymethoxyethyl methacrylate/vinyl chloride polymer, as shown above, makes it unusually valuable as an industrial finish where inertness and durability are required such as a finish for refrigerators, washing machines, sink cabinets, food lockers, food processing equipment, beverage tanks, automobiles, etc. If a zinc oxide coated titanium dioxide is used as the pigment in place of the titanium dioxide, insolubilization occurs in 30 minutes at 107° C. The same is true for basic blue lead pigment, zinc oxide, or zinc chloride. Sulfonic acids such as para-toluenesulfonic acid likewise permit low temperature cures.

Clear solutions flowed on glass and baked 30 minutes at 149° C. gave inert, tough, stiff, insoluble films of utility as wrapping foils. Insolubilization could also be achieved at 149° C. in a nitrogen atmosphere and in massive plastic sections indicating that crosslinking is not due to air-oxidation. This crosslinking which leads to enhancement of important polymer properties is thought to be due to acetal interchange yielding a three-dimensional polymeric network.

When xylene is used as the polymerization medium, or when higher polymerization temperatures are used with such high temperature catalysts as ditertiary butyl peroxide, the resulting methoxymethoxyethyl methacrylate/vinyl chloride polymers possess very low molecular weights, as reflected by the viscosities (0.005 poise to 0.06 poise at 25° C.) of 10 percent solutions in cyclohexanone. These polymers insolubilize similarly to the cited example to yield coatings with outstanding properties, but possess the added advantage of yielding solutions containing 40 to 50 percent solids at spray viscosity.

Certain polymers of vinyl chloride with vinyl acetate are now used to some extent for inert finishes, but they require large amounts of solvent (75–80%), they do not insolubilize on baking, they remain thermoplastic, and they are readily marred. The thermostat polymers described above exhibit none of these deficiencies.

Methoxymethoxyethyl methacrylate/vinyl chloride polymers have been prepared varying from 25 to 90 percent in combined vinyl chloride content and varying in viscosity from 0.005 poise, as 10 percent solutions in cyclohexanone, to 1.25 poise as 5 percent solutions in cyclohexanone. Below about 75 percent combined vinyl chloride content they are initially soluble in aromatic hydrocarbons. The high molecular weight polymers are best prepared by copolymerization of methoxymethoxyethyl methacrylate with vinyl chloride using water as the polymerization medium and alpha, alpha'-azobis(alpha,gamma-dimethylvaleronitrile) as catalyst at 40° C. These polymers can be used for such outlets as coated fabrics, unsupported films, synthetic fibers, molded plastics, linoleum binders, paper coatings and impregnants, and like uses.

*Example II*

The following materials were added to a glass reactor: 0.2 part alpha,alpha'-azodiisobutyronitrile, 44 parts of benzene, 25 parts of styrene, and 25 parts of methoxymethoxyethyl methacrylate. The reactor was loosely corked and placed in an oven at 55° C. for 64 hours. The viscous solution was coagulated with methanol and the copolymer filtered off and dried. The yield was 32 parts of a solid polymer analyzing 73.29, 73.03% carbon and 8.07, 8.11% hydrogen. These analyses indicate that this copolymer contains 49 percent combined styrene and 51 percent combined methoxymethoxyethyl methacrylate. Films baked 30 minutes at 177° C. possessed excellent color, gloss, adhesion, and soap bath resistance. The addition of small amounts (0.01–5%) of an acid catalyst such as para-toluene-sulfonic acid or zinc chloride lowered the curing temperature.

*Example III*

A stainless steel pressure reactor was charged with 352 parts of benzene, 0.2 part of 1,1'-azodicyclohexane carbonitrile, and 100 parts of methoxymethoxyethyl methacrylate. This charge occupied about 35% of the volume of the reactor. Oxygen-free nitrogen was injected into the reactor. After removal of the nitrogen by evacuation, the reactor was heated to 90° C., with agitation, and pressured to 950 atmospheres with ethylene. When the pressure decreased to 900 atmospseres the reactor was repressured with ethylene to 950 atmospheres. During a 14.5 hour polymerization period a total of 390 atmospheres of ethylene was absorbed. The reactor was then cooled and the excess ethylene bled off. The contents were dissolved in benzene and coagulated with methanol. On milling the polymer dry on a roll mill heated to 50° C., there was obtained 98 parts of a tough, flexible, elastic polymer analyzing 63.10%, 63.44% carbon and 9.87%, 9.88% hydrogen. These analyses indicated that this polymer contained 27 percent combined ethylene and 73 percent combined methoxymethoxyethyl methacrylate. Polymers of this type can be used for such outlets as safety-glass interlayers, shower curtains, coated fabrics and like uses, and can be cured readily by heat-treatment in the presence of an acid catalyst such as zinc chloride.

*Example IV*

The following compounds were placed in a reactor: 0.2 part of alpha,alpha'-azodiisobutyronitrile, 44 parts of xylene, and 50 parts of methoxymethoxyethyl methacrylate. The reactor was swept with nitrogen and heated at 100° C. for 1.5 hours. The resulting solution possessed a viscosity of 3.0 poises at 25° C. and contained 44 percent solids by weight. Coatings baked 30 minutes at 148.9° C. on bonderized steel panels possessed excellent color, gloss, adhesion, and impact flexibility and were no longer soluble in xylene. Traces of zinc chloride catalyst lower the curing temperature to 121° C. Methoxymethoxyethyl methacrylate monomer also polymerized in bulk in 4 days at room temperature under nitrogen in the absence of added catalyst, to yield a tough, flexible polymer.

*Example V*

The following compounds were placed in a reactor: 0.2 part of alpha,alpha'-azodiisobutyronitrile, 44 parts of xylene, 25 parts of bodied linseed oil, and 25 parts of methoxymethoxyethyl methacrylate. The reactor was swept with nitrogen, evacuated, closed, and heated for 64 hours at 55° C. The clear solution obtained, when flowed on steel panels and baked for 30 minutes at 149° C. gave films which possessed excellent gloss, leveling, adhesion, and impact flexibility and were tack-free.

*Example VI*

Bis(methoxymethoxyethyl) fumarate,

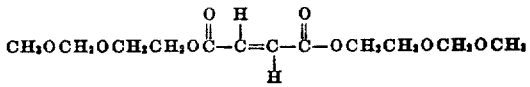

boiling point 160° C./0.5 mm., refractive index 1.4562, and saponification number 379, was prepared by ester interchange between dimethyl fumarate and methoxymethoxyethanol using sodium methylate as catalyst and benzene as the medium.

The following materials were added to a glass reactor: 0.1 part of alpha,alpha'-azodiisobutyronitrile, 5 parts of styrene, 5 parts of bis(methoxymethoxyethyl)fumarate, and 10 parts of xylene. After 16 hours at 60° C. the clear solution possessed a viscosity of 0.50 poise and contained 38.6 percent solids by weight, indicating a conversion of 77 percent. To 3 parts by volume of this solution there was added 0.1 part by volume of a freshly prepared saturated solution of zinc chloride in methyl isobutyl ketone. This solution, when applied to bonderized steel panels and baked 30 minutes at 121° C. gave coatings which were insoluble in xylene and possessed excellent color and gloss and no tendency to craze.

The same procedure as above but using 9 parts of styrene and 1 part of bis(methoxymethoxyethyl)fumarate gave a solution possessing a viscosity of 0.32 poise and 32.6 percent solids. After addition of zinc chloride catalyst, coatings baked for 30 minutes at 149° C. were found to be insoluble in xylene. Using 4 parts of styrene and 6 parts of bis(methoxymethoxyethyl)fumarate and following the same procedure a 42.4 percent solids solution in xylene was obtained at a viscosity of 0.65 poise. When 5 parts by volume of this solution was treated with 0.08 part by volume of a freshly prepared saturated solution of zinc chloride in methyl isobutyl ketone films baked for 30 minutes at 149° C. were found to possess excellent color, gloss, impact flexibility, adhesion, craze resistance, alkali-resistance, and solvent-resistance to xylene. Using 10 parts of styrene and no bis(methoxymethoxyethyl)fumarate a 27.4 percent solids solution in xylene was obtained at a viscosity of 0.32 poise, which after addition of zinc chloride catalyst or in its absence gave coatings after 30-minute bakes at 149° C. which were still soluble in xylene, extremely brittle to impact, possessed very poor adhesion, and crazed markedly.

Polymers of vinyl chloride with bis(methoxymethoxyethyl)fumarate insolubilized on 30-minute bakes at 149° C., or at lower temperatures when prolonged baking periods or acid catalysts are used. Methoxymethoxyethyl acrylate copolymers with styrene or vinyl chloride likewise insolubilize similarly to the bis(methoxymethoxyethyl)fumarate or methacrylate analogues.

Example VII

A reactor was charged with 5 parts of methoxymethoxyethyl methacrylate, 95 parts of styrene, and 0.5 part of alpha,alpha'-bis(alpha,gamma-dimethylvaleronitrile). The reactor was closed and heated under nitrogen for 72 hours at 45° C. The resulting polymer was removed from the reactor and 5 parts of para-toluenesulfonic acid was milled into it at 95° C. Bars were molded from the resulting product at 150° C. for 30 minutes. The cured product was found to be swollen but not dissolved upon immersion in benzene heated at 60° C. On a copper melting point block the product softened at 80° C. but did not melt even at 200° C.

Example VIII

A pressure reactor was charged with 12.5 parts of methoxymethoxyethyl methacrylate, 37.5 parts of methyl methacrylate, 145 parts of water, 0.5 part of ammonium persulfate, 0.1 part of sodium acid sulfite, and 2 parts of the sodium salt of a long chain alcohol sulfate. The mixture was heated with stirring at 40° C. for 19 hours. After coagulation, the polymer was washed free of catalyst and dispersing agent. On drying 48 parts of polymer was obtained. To the dried polymer there was added 5 parts of para-toluene-sulfonic acid and the blend milled at 127° C. Bars molded from the blend at 150° C. for 30 minutes were found to be swollen but not dissolved by benzene at 60° C. On a copper melting point block the product became pliable at 90° to 100° C. but did not melt even at temperatures up to 200° C. Films flowed on steel panels and baked for 30 minutes at 150° C. exhibited outstanding mar resistance and were no longer soluble in organic solvents.

Example IX

Allyl methoxymethoxyacetate

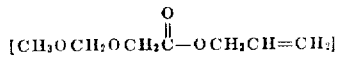

was synthesized as follows: methyl methoxymethoxyacetate was prepared from methylal and glycolic acid according to U. S. Patent 2,250,487 and the allyl ester prepared by ester interchange with excess allyl alcohol using sodium methoxide as catalyst and fractionating off the methyl alcohol as it was formed. The catalyst was neutralized with $CO_2$ and the excess allyl alcohol was fractionated off. The allyl methoxymethoxyacetate was then collected at 91–93° C. at 15 mm. pressure, $n_D^{25} = 1.4260$.

A stainless steel pressure reactor was flushed with nitrogen and charged with 176 parts of xylene, 4 parts of tertiary butyl alcohol, 0.25 part of maleic anhydride, 75 parts of allyl methoxymethoxyacetate and 1 part of alpha,alpha'-azodiisobutyronitrile. This charge occupied about 37 percent of the volume of the reactor. After removal of the nitrogen by evacuation, the reactor was cooled and 179 parts of vinyl chloride was added. The reactor was then agitated and heated to 59 to 62° C. The polymerization proceeded during a 10-hour period under autogenous pressure. At the end of the polymerization period the reactor was cooled to room temperature and the excess vinyl chloride was bled off. The polymer was leached with methanol, redissolved in acetone and coagulated with methanol. Yield was 38 parts of solid polymer, which by chlorine analysis was shown to contain 78.8% combined vinyl chloride and 21.2% combined allyl methoxymethoxyacetate. A 10% solution by weight of this polymer in cyclohexanone possessed a viscosity of 0.14 poise at 25° C. Ten parts of this polymer was sheeted on a 50° C. two-roll mill and 5 parts of titanium dioxide was added and the stock thoroughly compounded. An enamel of 40% solids content was prepared by treating the mill stock with 22.5 parts of a 50/50 mixture of xylene/methyl isobutyl ketone. This enamel when flowed on bonderized steel exhibited outstanding resistance to discoloration on baking at high temperatures. Coatings baked for 30 minutes at 177° C. remained white and in consequence of the high baking temperature exhibited outstanding adhesion as well as the desirable properties of high hardness and mar resistance and excellent inertness.

Other polymerization catalysts, whether of the free radical or ionic type, can replace the catalysts mentioned in the examples. Free radical generating catalysts comprise azo compounds, azines, oximes, amine oxides, peroxides, per salts, hydroperoxides, etc. Examples of ionic-type catalysts are boron trifluoride, ferric chloride, aluminum chloride, and the like. The amount of catalyst is generally in the range of from 0.001 to 5% by weight of the monomer of monomers polymerized.

As shown by the examples, the compounds having the formal-containing group can be polymerized alone or with a variety of other polymerizable compounds. When the latter are included, the compound having the formal-containing group should be present in amount of at least 5% by weight of the monomers polymerized. In order that the properties of the polymers be materially modified by the compound having the formal-containing group the polymerizable material not containing this group should not be present beyond 95% by weight of the monomeric materials polymerized. Examples of comonomers, in addition to those mentioned in the examples, include vinylidene chloride, vinyl acetate, vinyl fluoride, vinylidene fluoride, difluorovinylidene chloride, trichlorofluoroethylene, chlorotrifluoroethylene, tetrafluoroethylene, vinyl trimethyl acetate, vinyl benzoate, acrylonitrile, methacrylonitrile, acrylamide, methacrylamide, isobutylene, vinyl methyl ether, vinyl methyl ketone, methacrylic acid, butyl methacrylate, methyl acrylate, maleic anhydride, dimethyl maleate, dimethyl fumarate, itaconic acid, allyl acetate, diallyl phthalate, N-vinyl succinimide, isoprene, butadiene, 2,3-dichlorobutadiene-1, 3,2-chlorobutadiene-1,3, carbon monoxide, China wood oil, dehydrated castor oil, etc. Two or more monomeric formals likewise may be polymerized. If desired, the polymers with vinyl acetate may be partially or completely hydrolyzed and the resulting products, after conversion to fibers, and films, etc. crosslinked.

Because of the combination of valuable properties possessed by the polymeric polyformals described herein, and because they can be varied widely in physical properties, the present polymers are eminently suitable for decorative, industrial and maintenance finishes, coated fabrics, synthetic fibers, and monofils, unsupported sheeting, wrapping films, safety glass interlayers, substituted fabric outlets, adhesives, cable and wire coatings, laminates, artificial tile and floor coverings, tubing, molded plastic articles and like outlets. Plasticizers, pigments, dyes, reinforcing agents and like materials commonly used in formulating polymeric compositions can be used.

As many apparently widely different embodiments of this invention may be made without departing from the spirit and scope thereof, it is to be understood that this invention is not limited to the specific embodiments thereof except as defined in the appended claims.

I claim:

1. Polymeric material comprising the polymerization product of methoxymethoxyethyl methacrylate.

2. The insoluble product obtained by heating the polymerization product defined in claim 1.

3. A linear polymer which is the polymerization product of a compound of the formula

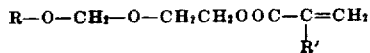

R in said formula being a hydrocarbon radical free from aliphatic carbon-to-carbon unsaturation and containing from 1 to 8 carbon atoms, and R' being selected from the group consisting of hydrogen and the methyl radical.

MILTON J. ROEDEL.

REFERENCES CITED

The following references are of record in the file of this patent:

UNITED STATES PATENTS

| Number | Name | Date |
|---|---|---|
| 2,129,694 | Izard | Sept. 13, 1938 |
| 2,268,611 | Mitchell | Jan. 6, 1942 |
| 2,382,938 | Gresham | Aug. 14, 1945 |
| 2,477,218 | Thompson | July 26, 1949 |

Certificate of Correction

Patent No. 2,570,861      October 9, 1951

MILTON J. ROEDEL

It is hereby certified that error appears in the printed specification of the above numbered patent requiring correction as follows:

Column 2, line 39, for "difficulty" read *difficultly*; line 44, for "65 C." read *65° C.*; column 4, line 64, for "thermostat" read *thermoset*; column 8, line 30, for "weight of" read *weight or*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.* outlets. Plasticizers, pigments, dyes, reinforcing agents and like materials commonly used in formulating polymeric compositions can be used.

As many apparently widely different embodiments of this invention may be made without departing from the spirit and scope thereof, it is to be understood that this invention is not limited to the specific embodiments thereof except as defined in the appended claims.

I claim:

1. Polymeric material comprising the polymerization product of methoxymethoxyethyl methacrylate.

2. The insoluble product obtained by heating the polymerization product defined in claim 1.

3. A linear polymer which is the polymerization product of a compound of the formula

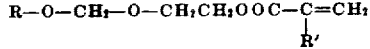

R in said formula being a hydrocarbon radical free from aliphatic carbon-to-carbon unsaturation and containing from 1 to 8 carbon atoms, and R' being selected from the group consisting of hydrogen and the methyl radical.

MILTON J. ROEDEL.

REFERENCES CITED

The following references are of record in the file of this patent:

UNITED STATES PATENTS

| Number | Name | Date |
|---|---|---|
| 2,129,694 | Izard | Sept. 13, 1938 |
| 2,268,611 | Mitchell | Jan. 6, 1942 |
| 2,382,938 | Gresham | Aug. 14, 1945 |
| 2,477,218 | Thompson | July 26, 1949 |

Certificate of Correction

Patent No. 2,570,861                 October 9, 1951

MILTON J. ROEDEL

It is hereby certified that error appears in the printed specification of the above numbered patent requiring correction as follows:

Column 2, line 39, for "difficulty" read *difficultly*; line 44, for "65 C." read *65° C.*; column 4, line 64, for "thermostat" read *thermoset*; column 8, line 30, for "weight of" read *weight or*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*

Certificate of Correction

Patent No. 2,570,861 October 9, 1951

MILTON J. ROEDEL

It is hereby certified that error appears in the printed specification of the above numbered patent requiring correction as follows:

Column 2, line 39, for "difficulty" read *difficultly*; line 44, for "65 C." read *65° C.*; column 4, line 64, for "thermostat" read *thermoset*; column 8, line 30, for "weight of" read *weight or*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*